(12) United States Patent
Schoenwald

(10) Patent No.: US 12,395,541 B2
(45) Date of Patent: Aug. 19, 2025

(54) EFFICIENT DISTRIBUTION AND DISPLAY OF MEDIA

(71) Applicant: Steven Thomas Schoenwald, Hinckley, OH (US)

(72) Inventor: Steven Thomas Schoenwald, Hinckley, OH (US)

(*) Notice: Subject to any disclaimer, the term of this patent is extended or adjusted under 35 U.S.C. 154(b) by 338 days.

(21) Appl. No.: 16/941,354

(22) Filed: Jul. 28, 2020

(65) Prior Publication Data

US 2021/0037071 A1 Feb. 4, 2021

Related U.S. Application Data

(60) Provisional application No. 62/879,619, filed on Jul. 29, 2019.

(51) Int. Cl.

| | |
|---|---|
| *H04L 29/06* | (2006.01) |
| *G06F 15/16* | (2006.01) |
| *H04L 12/26* | (2006.01) |
| *H04L 15/16* | (2006.01) |
| *H04L 29/08* | (2006.01) |
| *H04L 65/61* | (2022.01) |
| *H04L 65/612* | (2022.01) |

(Continued)

(52) U.S. Cl.
CPC .............. *H04L 65/80* (2013.01); *H04L 65/61* (2022.05); *H04L 65/612* (2022.05); *H04L 65/613* (2022.05); *H04L 65/752* (2022.05); *H04L 67/10* (2013.01); *H04L 67/06* (2013.01)

(58) Field of Classification Search
CPC ..... H04L 65/4069; H04L 67/06; H04L 67/10; H04L 65/80; H04L 65/601; H04L 65/4084; H04L 65/4092

USPC ......................................................... 709/219
See application file for complete search history.

(56) References Cited

U.S. PATENT DOCUMENTS

| | | | |
|---|---|---|---|
| 8,249,414 B2 * | 8/2012 | Ackley ............... | H04N 21/4314 386/219 |
| 8,650,283 B1 * | 2/2014 | Chang ............... | H04N 21/25875 709/224 |

(Continued)

FOREIGN PATENT DOCUMENTS

| | | | | |
|---|---|---|---|---|
| CA | 2945009 C | * | 10/2018 | ............. G01S 19/48 |
| CA | 3002977 C | * | 1/2019 | ............. G06F 21/10 |
| WO | WO-2004097688 A1 | * | 11/2004 | ....... G06F 17/30056 |

*Primary Examiner* — Emmanuel L Moise
*Assistant Examiner* — Berhanu Shitayewoldetadik
(74) *Attorney, Agent, or Firm* — Tarolli, Sundheim, Covell & Tummino LLP

(57) ABSTRACT

Systems and methods are provided for providing media content to subscribers. A system includes a source device storing first and second items of digital media content and a computing device. The computing device includes a network interface configured to receive the first and second items of digital media content from the source device via a network connection and a media player configured to simultaneously provide the first and second items of digital media content to a display of the computing device. The media player includes a synchronization component that monitors a first playback position, associated with the first item of digital media content, and a second playback position, associated with the second item of digital media content, and alters the first playback position when a time difference between the first playback position and the second playback position exceeds a threshold value.

19 Claims, 4 Drawing Sheets

(51) Int. Cl.
*H04L 65/613* (2022.01)
*H04L 65/752* (2022.01)
*H04L 65/80* (2022.01)
*H04L 67/10* (2022.01)
*H04L 67/06* (2022.01)

(56) References Cited

U.S. PATENT DOCUMENTS

| | | | |
|---|---|---|---|
| 8,935,322 B1* | 1/2015 | Grosz | G06F 16/50 709/203 |
| 10,410,535 B2 | 9/2019 | Breed et al. | |
| 10,572,268 B2* | 2/2020 | Crasta | H04L 67/104 |
| 10,893,303 B1* | 1/2021 | Mitaru | H04N 21/2353 |
| 11,294,987 B2* | 4/2022 | Ziring | G06F 21/10 |
| 2002/0100052 A1* | 7/2002 | Daniels | H04N 21/812 348/E7.063 |
| 2002/0138619 A1* | 9/2002 | Ramaley | H04L 65/1108 709/217 |
| 2004/0002993 A1* | 1/2004 | Toussaint | G06F 16/48 |
| 2005/0028206 A1* | 2/2005 | Cameron | H04N 21/25891 725/51 |
| 2005/0055717 A1* | 3/2005 | Daniels | H04N 5/76 348/E7.071 |
| 2005/0055730 A1* | 3/2005 | Daniels | H04N 7/088 348/E7.063 |
| 2005/0060755 A1* | 3/2005 | Daniels | H04N 21/84 348/E7.071 |
| 2005/0060756 A1* | 3/2005 | Daniels | H04N 21/47208 348/E5.103 |
| 2005/0086696 A1* | 4/2005 | Daniels | H04N 7/17336 348/E5.103 |
| 2006/0112143 A1* | 5/2006 | Subramanian | H04N 21/4331 |
| 2006/0177198 A1* | 8/2006 | Jarman | H04N 9/8042 386/280 |
| 2006/0248122 A1* | 11/2006 | Nikiel | H04L 67/568 |
| 2007/0083467 A1* | 4/2007 | Lindahl | G11B 20/00195 375/E7.009 |
| 2007/0226365 A1* | 9/2007 | Hildreth | H04N 21/234309 375/E7.198 |
| 2007/0233816 A1* | 10/2007 | Odenwald | G06F 16/634 709/219 |
| 2007/0245882 A1* | 10/2007 | Odenwald | G11B 27/10 707/E17.101 |
| 2008/0059519 A1* | 3/2008 | Grifftih | H04L 67/06 |
| 2008/0141328 A1* | 6/2008 | Weintraub | H04N 21/2747 348/E7.071 |
| 2008/0222201 A1* | 9/2008 | Chen | G06F 16/58 |
| 2009/0217324 A1* | 8/2009 | Massimi | H04H 60/46 725/9 |
| 2011/0202679 A1* | 8/2011 | Cohen | H04L 63/14 709/238 |
| 2012/0008786 A1* | 1/2012 | Cronk | G06F 21/10 726/28 |
| 2012/0144435 A1* | 6/2012 | Spilo | H04N 21/43615 725/78 |
| 2013/0046818 A1* | 2/2013 | Klein, Jr. | G11B 27/322 709/203 |
| 2014/0101586 A1* | 4/2014 | Kienzle | G06F 3/0483 715/769 |
| 2014/0115114 A1* | 4/2014 | Garmark | H04L 69/329 709/219 |
| 2014/0181849 A1* | 6/2014 | Casey | H04N 21/442 725/14 |
| 2014/0208206 A1* | 7/2014 | Scott | G06F 3/0482 715/716 |
| 2014/0215201 A1* | 7/2014 | Pfeifer | G06F 9/441 713/100 |
| 2014/0222613 A1* | 8/2014 | Ryu | G06Q 30/06 705/26.7 |
| 2014/0330597 A1* | 11/2014 | Griffith | G06Q 10/02 705/5 |
| 2015/0052434 A1* | 2/2015 | Ramaley | G06F 3/0481 715/716 |
| 2015/0135049 A1* | 5/2015 | Murphy | G06Q 30/00 715/205 |
| 2015/0286715 A1* | 10/2015 | Barraclough | G06F 16/639 707/769 |
| 2016/0050243 A1* | 2/2016 | De Vleeschauwer | H04L 65/80 709/231 |
| 2016/0070444 A1* | 3/2016 | Valimaki | H04L 65/00 715/716 |
| 2016/0112279 A1* | 4/2016 | Kalanithi | G06F 3/03 715/736 |
| 2016/0173347 A1* | 6/2016 | Rajapakse | H04W 24/10 709/224 |
| 2016/0295275 A1* | 10/2016 | Cholas | H04N 21/47214 |
| 2017/0163605 A1* | 6/2017 | Martin-Bale | H04L 67/125 |
| 2017/0255681 A1* | 9/2017 | Giunio-Zorkin | G06Q 50/01 |
| 2017/0277376 A1* | 9/2017 | Bilinski | H04N 21/6587 |
| 2017/0330336 A1* | 11/2017 | Roblek | G06F 16/434 |
| 2018/0012378 A1* | 1/2018 | Khandpur | G06T 11/001 |
| 2018/0307501 A1* | 10/2018 | Crasta | G06F 9/44505 |
| 2019/0132219 A1* | 5/2019 | Gandhi | H04L 12/5692 |
| 2019/0171666 A1* | 6/2019 | McKenzie | G06F 16/5866 |
| 2019/0221131 A1* | 7/2019 | Levinson | G09B 7/07 |
| 2020/0014609 A1* | 1/2020 | Hockett | H04L 67/1001 |
| 2020/0117474 A1* | 4/2020 | Crasta | H04L 67/06 |
| 2020/0394053 A1* | 12/2020 | Jain | G06F 8/65 |
| 2021/0217203 A1* | 7/2021 | Kim | G06T 9/001 |
| 2021/0218995 A1* | 7/2021 | Shin | H04N 19/597 |

* cited by examiner

EFFICIENT DISTRIBUTION AND DISPLAY OF MEDIA

RELATED APPLICATIONS

This application claims priority from U.S. Patent Application Ser. No. 62/879,619, filed 29 Jul. 2019 and entitled ASSOCIATION, MAPPING, CHRONOLOGGING, AND UTILIZATION OF PROFILES, MENUS, AND MEDIA, which is incorporated herein in its entirety.

TECHNICAL FIELD

This invention relates to media distribution systems, and more particularly, to efficient distribution and display of media.

BACKGROUND

Digital media distribution is the delivery or distribution of digital media content such as audio, video, e-books, video games, and other software. The term is generally used to describe distribution over an online delivery medium, such as the Internet, thus bypassing physical distribution methods, such as paper, optical discs, and VHS videocassettes. With the advancement of network bandwidth capabilities, online distribution has become increasingly prominent, with large amounts of the media consumed in the United States being provided via digital media distribution.

SUMMARY

In accordance with one aspect of the present invention, a method includes storing a digital media file, associated with a set of subscribers, on a source device associated with a distributed network. A file representing the digital media file is provided to each of a plurality of computing devices associated with the set of subscribers via the distributed network in response to storing the digital media file on the source device. Each of the plurality of computing devices stores a media player application. The file representing the digital media file is utilized at the media player application stored on each of a set of computing devices associated with the set of subscribers to provide the digital media file to the set of subscribers.

In accordance with another aspect of the present invention, a system is provided for providing media content. The system includes a source device storing first and second items of digital media content and a computing device. The computing device includes a network interface configured to receive the first and second items of digital media content from the source device via a network connection and a media player configured to simultaneously provide the first and second items of digital media content to a display of the computing device. The media player includes a synchronization component that monitors a first playback position, associated with the first item of digital media content, and a second playback position, associated with the second item of digital media content, and alters the first playback position when a time difference between the first playback position and the second playback position exceeds a threshold value.

In accordance with yet another aspect of the present invention, a method is provided. First and second items of digital media content associated with a set of subscribers are stored on a source device associated with a distributed network. A file representing the first and second items of digital media content is provided to each of a plurality of computing devices associated with the set of subscribers via the distributed network in response to storing the first and second items of digital media content on the source device. Each of the plurality of computing devices stores a media player application. The file representing the item of digital media content is utilized at the media player application stored on each of a set of computing devices associated with the set of subscribers to provide the first and second items of digital media content to the set of subscribers. The file representing the item of digital media content at the media player application is utilized at each of the set of computing devices without input from an associated subscriber of the set of subscribers.

The first and second items of digital media content are simultaneously provided to a display of a given one of the set of computing devices via the media player application. Each of a first playback position, associated with the first item of digital media content, and a second playback position, associated with the second item of digital media content are monitored at the media player application. The first playback position is altered when a time difference between the first playback position and the second playback position exceeds a threshold value. A predetermined condition is received at a given computing device of the set of computing devices from an associated subscriber via a user interface. The first and second items of digital media content are deleted from the given computing device when the predetermined condition is met.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

Figure 1:
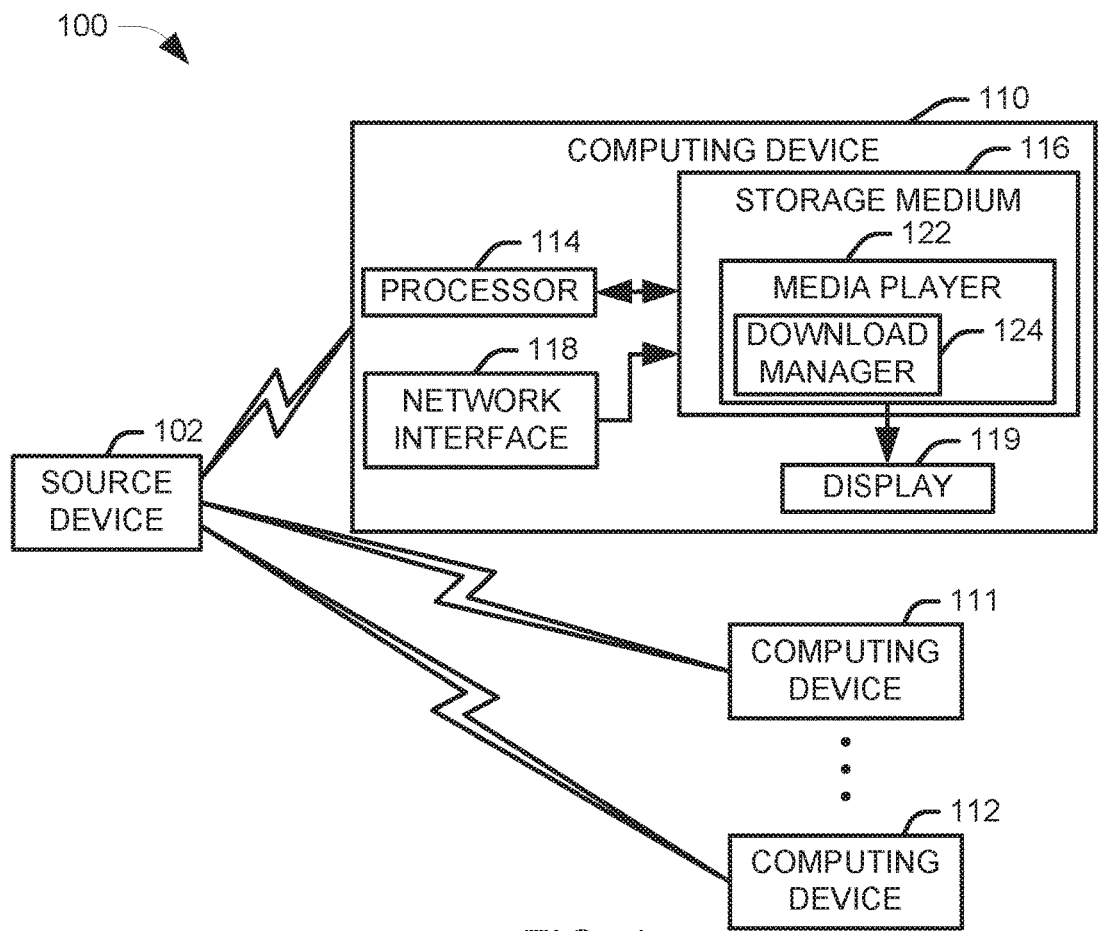
FIG. 1 illustrates one example of a system for efficiently distributing media content to a plurality of subscribers.

In the context of the present disclosure, the singular forms "a," "an" and "the" can also include the plural forms, unless the context clearly indicates otherwise. The terms "comprises" and/or "comprising," as used herein, can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items.

Additionally, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or acts/steps) is not limited to the order presented in the claims or figures unless specifically indicated otherwise.

As used herein, an "item of digital media content" is an item of digital content comprising one or more of text, images, audio, and video. Examples of items of media include, but are not limited to, editable and non-editable text documents, presentation files, images, audio files, video files, and spreadsheets.

As used herein, a "digital media file" is a file containing at least one item of digital media content that is audio or video content.

As used herein, a "file representing an item of digital media content" is either a file containing the item of digital media content, a torrent file representing the file containing the item of digital media content, a magnet link representing the file containing the item of digital media content, or a notification to an application stored on a computing device that the file containing the item of digital media content is available for download.

As used herein, a "distributed network" is a network in which files are stored across multiple nodes of a network in a manner accessible without a central server or directory of files. Examples of distributed networks include peer-to-peer networks, such as blockchain networks.

As used herein, the term "substantially identical" refers to articles or metrics that are identical other than manufacturing or calibration tolerances.

As used herein, a "source device" is a computing device that is a computing device within a network to which an item of digital media content is initially uploaded. A source device can be a server in a centralized network or a node associated with a content provider on a distributed network.

As used herein, content is "not visible to a user" when it is intentionally provided in a manner that is not practically viewable by the user, such that the content of the media cannot be readily discerned by the user. For example, content that is displayed outside of a visible area of the display, has an applied opacity that renders it not visible, or is minimized to an area of the display (e.g., a single pixel) that cannot be readily seen by the user is all intended as content that is not visible to the user.

Extensive use of video in content distribution and distance learning, particularly with simultaneous playback of multiple synchronous videos with file attachments and complex machine-implemented translations, is possible by increasing cloud data storage, processing, and transfer, or egress, costs far beyond what one would expect for a typical video of the same quality. These aggregate costs can make usage of such a platform too expensive for most school districts to afford, let alone those in poor nations for which distance learning technology can have its biggest impact. A theoretical way of significantly reducing costs is by integrating a 'silent' torrenting system between classmates or other distributed network. Users in a class can share media and documents with one another, minimizing egress from the origin server and/or content distribution network (CDN). Origin server or CDN egress represents the largest expenditure schools and students would incur through usage of a video-centric education platform, so curtailing such costs is critical for enabling such students to utilize remote learning and other interactive media to its greatest potential.

Synchronous digital picture-in-picture playback is complicated to implement, which is why it isn't used in digital media despite its former prominence in analog television. Many factors have to be balanced, from the back-end technology to bandwidth constraints, device processing power, and even the design itself. Livestreaming, while giving the impression of synchrony, actually realizes various stages of lag for users, but since only one person is typically talking at a time, the desynchronization does not greatly impact the user experience. Embedding a separate window into a larger stream is one way to avoid the complication of digital synchronization at the cost of either losing customizability of the position and priority of the streams or by offering multiple streams with the content combined in different manners. For interactive applications, enabling multiple media streams, generally video streams, to be easily manipulated by the user greatly enhances the user experience.

FIG. 1 illustrates one example of a system 100 for efficiently distributing media content to a plurality of subscribers. For example, the system 100 can be employed to distribute media associated with a remote learning course, including lecture videos and audios, presentations to accompany the lectures, and course materials. The system 100 includes a source device 102 and a plurality of computing devices 110-112. The source device 102 can be implemented as a virtual or physical server, or as a computing device within a distributed network.

Each of the plurality of computing devices 110-112 is connected to the source device 102 via a computer network. A given computing device (e.g., 110) can include a processor 114, a non-transitory storage medium 116, a network interface 118, and a display 119. Examples of computing devices 110-112 can include personal computers, thin clients operating in concert with an associated server, streaming players, smart televisions, and mobile devices, such as smartphones and tablets. The non-transitory storage medium 116 can store executable instructions that, when executed by the processor, provide a media player application 122 configured to provide media content received at the network interface 118 to the display 119. In some examples, the media player application 122 can also manage media content on the device by initiating downloads of new content, deleting content when various conditions are met, and marking content that has been viewed by the subscriber.

In one implementation, the media player can simultaneously provide multiple items of digital media content to a display of the computing device. In this instance, the media player can include a synchronization component (not shown) that monitors the playback positions of the items of digital media content and alters the playback position of one or more of the items of content when a time difference among playback positions exceeds a threshold value. By accessing multiple items of content simultaneously, the subscriber can be provided with material pertinent to a given video, for example, an accompanying presentation, another visual or audio stream, or a set of notes, that is synchronized with the video.

In one implementation, the computer network is a distributed network, such as a blockchain or other peer-to-peer network. In one example of a peer-to-peer network, one or more of the computing devices 110-112 serve as nodes on the distributed network, allowing subscribers to exchange media content among one another. In this example, the subscribers associated with the computing devices 110-112 can agree to utilize a portion of their bandwidth and storage as nodes in a peer-to-peer network to reduce the transfer costs and time of distribution for the content provider. Ideally, interactions with the peer-to-peer network can be automated at the video player, such that retrieval and listing of media content takes place without the active participation of the subscriber. Specifically, the source device 102 can be configured such that when a user stores a digital media file in a particular location on the device, the digital media file is automatically made available to the plurality of computing devices 110-112 over the distributed network.

In one example, when the digital media file is stored in the appropriate location, a torrent file representing the digital media file is generated in response to storing the digital media file on the source device. Either the torrent file or a magnet link representing the torrent file can be provided to each of the plurality of computing devices 110-112 via the distributed network. The torrent file or the magnet link can be utilized at the media player application 122 at each of a first proper subset of computing devices (e.g., 110) to download the item of digital media content from the source device 102 via the distributed network. Other devices (e.g., 111 and 112) can utilize the torrent file or the magnet link at the media player application 122 to download the digital media file from devices that received the digital media file from the source device 102 or another computing device, such that the other devices do not need to receive the digital media file directly from the source device.

Accordingly, back-end peer-to-peer (P2P) torrenting can be applied to encourage data sharing between participants of a given remote learning course, reducing egress costs generated from the origin server or content distribution network (CDN). Sharing like data between devices could exponentially decrease the costs a school or student needs to pay to receive media and documents. Accordingly, in this implementation, the source device 102 can include an instantiation of the media player application 122 for which a user having a specific authorization can add or remove files associated with a given set of subscribers. The set of subscribers can be input by the authorized user or added or removed based on one or more of several factors, for example, registration status or user type.

The media player application 122 at the source device can also include additional tools for uploading and editing items of digital media content. In one example, the media player application 122 provides a media upload and editing interface that identifies how many visual and audio streams will be used in a single digital media file (e.g., class recording, entertainment media, interactive simulation, game, visual novel, GXC file, etc.), identify the primary visual & audio streams, enable alignment of otherwise dyssynchronous media streams, and enable the trimming of or, in the case of static media, expansion of, media objects to optimize content to be packaged. In some examples, the media player application can allow the user to add markers onto media objects to aid in alignment, for example, triggering a 'snap' of the media to a defined location when other media is moved to the marker's location or consolidating media objects of like type, such as visual or audible media, to reduce the number of streams. The media player application 122 can also provide automatic synchronization of audio and/or visual streams based on identifiable characteristics from other media. Additional features, such as transitions, media blending or layering, filters, sound or playback speed settings, and other such effects can also be included, depending on the specific use case for the media player application 122.

In one implementation, the user can position a duration of a display for an item of digital media content within an overall duration of a digital media file. In one example, static media has a default duration that appears on a timeline representing the duration of the digital media file. Each media object is initially uploaded to a new media stream independent from all others, with the first visual and audio streams uploaded, even if from a single file, marked as the primary stream of that media type. By default, only the primary audio stream will be enabled, but that restriction can be removed by activating an option to allow more. The default maximum media duration is equal to the longest initial media duration. The maximum duration may change depending on if media was trimmed at either or both of their onset or conclusion, if static media was expanded to a duration longer than its set default, or if media is added from one stream to another of a matching type. Table 1 provides one example:

TABLE 1

| MEDIA | TYPE | DURATION |
| --- | --- | --- |
| A | Audiovisual | 5 min |
| B | Audiovisual | 6 min |
| C | Image | 1 min |
| D | Video | 2 min |
| E | Text | 1 min |
| F | Audio | 4 min |

In the example of Table 1, the initial size of the audio & visual timelines would be 6 minutes, the duration of the longest audio & visual content uploaded before editing. This is despite the audio and video from Media A being set as the default, since they were uploaded first. Secondary streams are added in the order in which media objects are uploaded or, alternatively, selected for upload. In most circumstances, any secondary audio-visual streams will be reduced in duration to match that of their primaries. If a discrepancy exists at time of submission, the user would be prompted to make changes or accept as shown.

The media player application 122 allows a user to freely move content around the timeline. Whenever either a visual stream or an audio stream from audiovisual content is moved, its counterpart will likewise move to the same position. Items of digital media content can be moved by clicking or touching an object and dragging the object left or right to adjust the media alignment against that of other objects. Start & end times along a media stream will display when an adjustment is made. Markers can be added to media objects & named to aid in alignment, with a thin line extending across all media streams to serve as a visual indicator. When media is dragged close to a marker line, the position will change color or highlight. If the cursor is released at this point, the media will 'snap' into place at the marker position.

Moving media beyond the boundaries of the maximum stream size is possible. Dragging media beyond the boundaries will have the media move to said location. Until said media is released, the boundary or boundaries of the stream before the move will be marked, serving as temporary snappable markers in case the media was moved too far. When media is released beyond the original boundary, all other displayed streams will expand to that point. Clicking the name or edge of a stream and dragging it on top of or below another stream will move the selected stream to that position. Clicking a media object and dragging it to an open position on a separate stream will move the object to that position. If the movement results in a stream containing no media, said stream will automatically disappear. Moving media of a given type (e.g., audio or visual) beneath the last stream of said type will cause a prompt to appear asking the user if they would like to create a new stream. If released with the prompt visible, the stream will be created with said media on it. Draggable media object bars may contain visuals, such as waveforms, image thumbnails, or preview video, to help users better visualize the content they are adjusting. Further, audio and visual streams can also be played to offer further assistance.

Adjacent to the adjustable stream visuals, for example, above the timelines, one or more preview windows can be present so one or more media objects can be reviewed or compared during adjustments. Visual previews will default to a media object's start time unless the ending edge is being expanded or reduced, or if a marker is selected or set beforehand at a different position. For audio previews, similar rules apply with the exception that the waveform displayed will be centered and focused to only show a section of said waveform closest to the selected point. Mobile views & thin displays may alternatively show only the primary media stream preview and the selected media stream preview for whatever media type (e.g., visual or audio) is selected to maximize the practical utility of available screen space.

Since not every potential user is familiar with torrenting or peer-to-peer networks generally, the system 100, and in particular the media player application 122, is configured to make usage of this technology intuitive, preferably so that all media distribution occurs without substantial interaction from the end-user. To this end, the source device 102 can be configured to automate provision of digital media files to the distributed network and the media player application 122 can be configured to utilize a provided torrent file, magnet link, or other peer-to-peer link (such as those used via the InterPlanetary File System (IPFS), blockchains, etc.) automatically, either upon receipt or when a predetermined condition is met, to download the corresponding digital media file without immediate input from the user. It will be appreciated that automated downloading can be a configured option within the media player application requiring a user to opt-in to automated downloads, and that by "without input from the user", it is meant that the no action is necessary from the user after the torrent file is received to initiate the download.

The conditions necessary for download, where present, can be defined by the user and can, for example, specify a permitted window of time for downloads or a necessary level of available of resources at the device (e.g., bandwidth, disk space, processing capacity, etc.). Alternatively or additionally, the media player application 122 can be configured to adjust prioritization of bandwidth usage on the computing device 110 to retrieve and utilize media from the network with minimal interference from tertiary processes, or conversely, to deprioritize bandwidth usage to levels able to sufficiently support whatever actions the user initiates while downloading or decryption of media received from the network takes place in the background. This can include the ability to restrict or limit the ability to download or stream media content based on the amount of disk space on the computing device 110, and, potentially, processing power for streamed data packet decryption. The media player application 122 can also have the capacity to apply, identify, and decrypt encoding and security for downloaded or streamed media, either by unpacking data packets within a container or via direct decryption of the data packets themselves. When the media content includes picture-in-picture content, as will be discussed in more detail below, the media player application 122 can be configured to identify separate, synchronous media streams within downloaded content and subsequently calculate bandwidth requirements (e.g., via bitrates, split proportionally as needed) for said streams to ensure all displayed streams play simultaneously while remaining synchronized.

It will be appreciated that the digital media file and its associated content can be provided to a given computing device as streaming content, but, in some implementations, the media player application 122 can be configured to download and store digital media files for offline viewing. To this end, the media player application 122 can include a configurable download management component 124 that manages media content stored on the device. In one implementation, the download management system 124 allows the user to initialize and configure automatic downloading of digital media files. Specifically, the user can select the option for automatic downloading and select if they want automatic downloads to occur over both mobile data and WiFi, depending on availability, or via WiFi only. Where downloading via mobile data is permitted, download speeds can be increased by using both WiFi and mobile data for downloading content. To this end, a file's packets can be divided into two groups, one which will download over WiFi, and one which will download over data. By default, the size of these queues would adjust based off of the speeds of the networks; if downloading over WiFi is quicker than downloading over data, for example, then the 'WiFi' group will grow in size, adding packets from the data group. This can also be performed over other combinations of data networks, including wired connections or short-range data connections such as Bluetooth when feasible.

In one implementation, media content can be played during downloading, which functions similarly to streaming. When a playable file type is detected, the packets downloaded for a given file can be frontloaded so that the video content can begin playing almost immediately, although this can be limited where the download speed is smaller than the bits per second necessary to play the file. In contrast to streaming, however, instead of the playable content being stored in RAM memory, it would be downloaded to physical memory. Only one download request would be necessary for near-instant playback and file archival, as since the file type is known, the player can be coded to read that type of file so that incomplete content can be used for playback.

In one implementation, automatic downloading can be subject to user defined conditions, for example, based on network availability, specific times, or device resources. In one example, the user can decide if they want automatic downloading to occur immediately when new content is uploaded or during a specified time range of their choice, typically from 3 am-6 am local time by default. The former option would ensure the user always has content as soon as it becomes available while the latter could be set so that downloads would take place when a user is otherwise not using the internet or when bandwidth capacity is high. Another option would be to collect data over time at the source device 102 to determine the time of day content is typically accessed by users. Those who access content shortly after it is downloaded could be provided enhanced priority, allowing them to be the seed devices in the distributed network, while those that don't view content as quickly could be deprioritized based off of their usage, subject to each user's individual settings.

Users can also select devices for which they want automatic downloads enabled for. Every device with an active login, which lasts for a predefined number of days spanned across all associated accounts, is populated in a device list of the download management component 124. From this device list, automatic downloads can be enabled or disabled for any of the devices listed. As a security measure, devices can be nicknamed and remotely logged off from this menu as well, which is useful for preventing unauthorized access after the account is accessed on a public or shared device.

The user's current course or group subscriptions, spanned across all associated accounts & sometimes referred to as 'channels', can be displayed below the device list. Information about each group is listed here along with the subscription date, number of media items in the group, the date of the last media item uploaded, what email subscribed to the group, and an button for viewing additional information, setting when the subscription start date should begin, with the current date resulting in automatic download of all new videos going forward and selecting 'All' or a specific video number will start content downloads from that point forward. The interface of the download management component 124 can also include controls for removing group subscriptions, and seeing a list of media items, each with a singular download option, and upload dates within a set group. Unsubscribing to a course/group will prompt the user to decide if they want to delete all videos in this said course/group or store them as normal.

The download management component 124 can also display a download queue, comprising a list of all content to be downloaded both presently and indefinitely, prioritized according to a given user's settings. A ranking or sorting interface allows items in the queue can be ranked by the user, with all downloads prioritized in this order. In one example, the download management component can include a drag-and-drop interface with 'send to top' and 'send to bottom' shortcut buttons. By way of example, if a user might select two videos to download and subscribe to a course or channel retroactively from two months prior. If selected in this order, the two videos would be added to the queue first followed by all videos from the subscribed course from the date or video selected to the present day. The user could then choose to move any of the videos in the queue around, including placing the initial two videos added after the auto-populated videos from the subscription. Any subsequent media released for subscribed courses/groups would then populate after all other items in the queue in chronological order, although the user can still increase their priority in the queue if desired.

While downloading media allows users instant access to content, they are limited by the amount of disk space on their devices. This is especially limiting on mobile devices without SD cards. To prevent this, the download management component 124 can include an automatic file deletion system to prevent frequent memory space restrictions, which can be activated or deactivated by the user. Users have options to set predefined conditions for deleting downloaded content from local storage, including conditions based on time constraints (e.g., days since last viewed, days since first viewed, or days since the file was downloaded), space left on a storage medium (e.g., absolute space remaining or a percentage of available space remaining), or a number of items of digital media content from the media player application 122 that are currently stored on the machine. In one implementation, if no condition is defined by the user, videos are automatically deleted when less than eight percent of available storage remains. Files can be deleted, for example, based upon the time since they were last viewed by the user. Another potential option would be to set a priority for which files to delete first, for example, in a second queue which could be set to active or inactive.

Media can be marked to be saved or archived regardless of whether automatic downloads are set to on or off. In one example, the download management component 124 allows for individual files to be marked to circumvent deletion via a long-hold or right-click selection or menu. Similarly, an individual course or channel could be marked, meaning that until unmarked, all videos within that course or channel will be saved unless manually deleted. A secondary option for saving a media file from deletion would be to go to the playback screen, select an options button, and mark the video for saving from there. Similarly, a subscribed course or channel can be selected from the download queue and marked for archiving from there. Saved or archived media and/or courses or channels can be marked by either an icon, a color highlight, or a shaded area to indicate their designation. Furthermore, a list of media marked for archival can listed with the download queue for easy access and, should the user choose, deselection or deletion.

Figure 2:
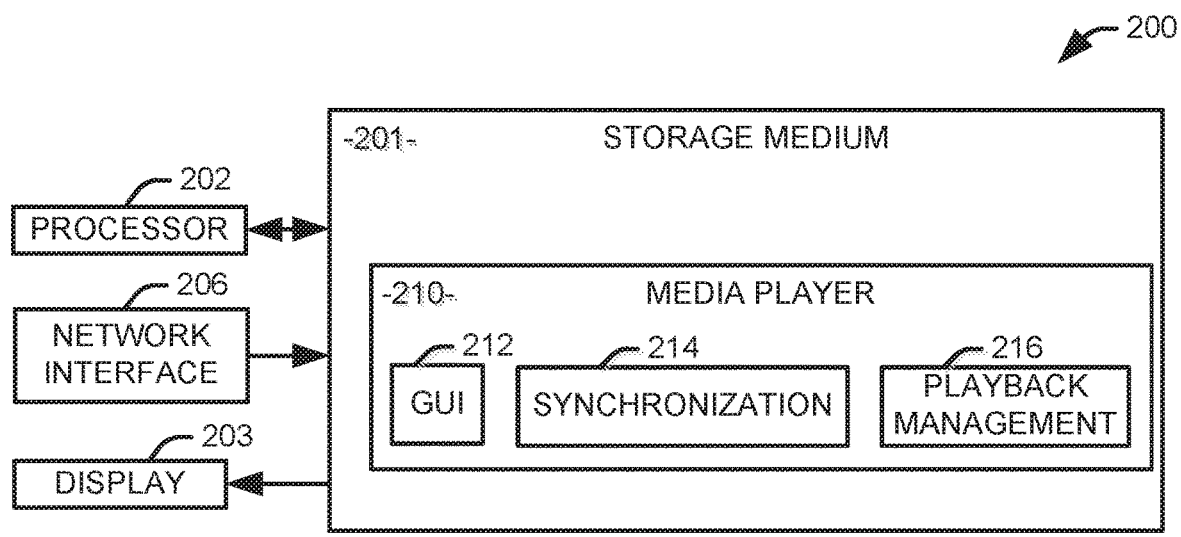
FIG. 2 illustrates one example of a computing device storing a media player application that efficiently receives and displays digital media content.

FIG. 2 illustrates one example of a computing device 200 storing a media player application 210 that efficiently receives and displays digital media content in a non-transitory computer readable medium 201. In the illustrated example, the media player application 210 is executable by an associated processor 202 to simultaneously provide the first and second items of digital media content to a display 203 of the computing device 200, providing synchronized digital picture-in-picture playback of the first and second items of digital media content. This allows the position and size of the streams to be customizable by the user.

In one implementation, the media player application 210 provides two primary viewing options, a tiered view for two visual streams, or videos, with a large primary video in the background and a smaller (e.g., ~20% area) secondary video in the forefront, and a second tiled view, generally used for more than two video streams are present, where each video is approximately proportional to one another, with allowances for some sizing customizations when an unusual number of videos are selected featuring different rotational views. For example, if three videos are selected for viewing, two in a landscape view and one in a horizontal view, the default display would show a tiled view with four quadrants, two of which house one landscape video each, and the remaining two housing an expanded landscape video. It will be appreciated that individual visual streams can be selectable for display, such that the user can display less than all of the items of digital media content associated with a given digital media file.

In one example, a preset number of visual streams are displayed by default, typically corresponding with the maximum number of visual views uploaded, but the visual streams displayed can be changed by checking or unchecking the boxes next to each video stream at a graphical user interface (GUI) 212. The streams associated with each box checked will display in the visual area, and each box unchecked will be absent from the visual area or otherwise not visible to the user. When a visual stream is not selected, to maintain synchronization and overcome the limitations of some devices, the media player application 210 can be configured to provide the first item of digital media content to the display in a form that is not visible to a user of the computing device. For example, the size, opacity, or position of the visual streams that are not selected can be altered to remove them from the view of the user while still maintaining synchronization of the display. For example, the non-selected visual streams can be placed outside of the visual area, have an opacity of 100% applied, making them effectively invisible, or be minimized to a single pixel overlaid on top of the primary visual stream.

The GUI 212 can also include controls placed over the visual playback area. The controls appear when touching the visual area or activating the media playback bar, but are hidden after a few moments. One control, the "PiP-switch-stream", switches the position of the primary and secondary visual streams when two videos are present in a tiled view. A second button turns the picture-in-picture on or off. When picture-in-picture is off, the video in the primary position, namely the large video in the tiered view and the upper-right video in the tiled view, to take up the full visual area with no other visual streams showing, while turning it on will cause the visual area to return to its previously enabled picture-in-picture state, with all videos that are selected for viewing. A third option becomes available only when three or more visual streams are available to select from; choosing it will open up a hidden menu panel, or drawer, on the right side of the screen containing thumbnail previews of each video stream along with a brief description and a checkbox. In practice, the GUI 212 can include a drawer on the left that, when accessed, displays single-or-multi-visual-stream videos associated with a given subscription, while a drawer on the right, when accessed, displays all the available visual streams within a single digital media file.

When multiple secondary streams are activated, visual streams are added into open slots until no open spots remain, with visual streams in the primary position given sizing priority when open slots remain. For two visual streams, the preset defaults can include two tiered screens in landscape orientation, in a standard view or full screen display, two screens in portrait orientation, with two streams tiled side by side in a standard view or tiered in a full screen display, or one screen in each orientation, which are tiered in a standard view and tiered in a full screen display in the orientation associated with the primary stream. For three streams in a landscape orientation, the streams can be tiled in a 2×2 arrangement in either view.

For three streams in a portrait orientation, the three screens can be tiled in a 3×1 arrangement in a standard view and tiled in a 2×2 arrangement during full screen display. When two of the streams are in a landscape orientation and the remaining screen in a portrait orientation, the streams can be tiled in a 2×2 arrangement with the portrait stream using two slots in either view. When two of the streams are in a portrait orientation and the remaining screen in a landscape orientation, the streams can be tiled in a 2×2 arrangement with a portrait stream using two slots in the standard view and the landscape stream using two slots in the full screen display. For four visual streams, the streams are always tiled in a 2×2 arrangement in the standard view. In a full screen display, the orientation of the tiles is determined according to the number of streams in each orientation, with a landscape orientation used when there are three or four landscape streams and a portrait orientation used when there are three or four portrait streams. Where there are two streams of each type, the orientation of primary stream is used during full screen display.

The media player application 210 is not limited to these default arrangements, and the position of picture-in-picture videos can be changed using drag and drop functionality with the GUI 212. For tiered picture-in-picture, touching a secondary video allows it to be moved to another quadrant via a finger swipe or a mouse click & drag. Once the finger/mouse enters another quadrant, the selected video will automatically snap into a pre-determined 'optimized' location for the video as a way of maintaining consistent proportional spacing across devices. While free-form positioning is one option that could be implemented in the media player application, it is not used in this example implementation as it would be expected to require more time for the user to position properly and could conflict with video overlay controls or subtitles.

Similarly, for tiled picture-in-picture, videos can be moved to open positions using the same drag and drop functionality. In cases where a tiled video is dragged over the position of another tiled video, the positions of the videos will swap. For visual streams displayed in approximately equal sizes and rotations, the videos will merely swap positions and maintain the same size. For visual streams where the rotations are approximately equal but the visual sizes vary, the size of the larger visual stream and smaller visual stream will swap both their sizes and positions within the total visual area. For visual streams where the visual sizes are approximately equal but the rotations vary, the positions of the videos merely switch, potentially along with the position of a third video if it maximizes visual area size.

In one example, in instances where a visual stream is in a compressed state, for example where a portrait-positioned visual stream is being shown in a tiled picture-in-picture view with three landscape visual streams, a control, such as a button, can be placed in a corner of the respective visual stream sector or quadrant, for example, in the upper-left corner. Selecting the button will cause portrait visual streams to expand to their maximum width, centered within the landscape view, but cropped within the constraints of the sector's or quadrant's view. The user could then control the positioning of the visual stream upwards and downwards by long holding said visual stream and swiping or scrolling upwards or downwards as needed. Similarly, compressed-state landscape-view visual streams would expand to the maximum height, centered within the portrait view, but cropped within the constraints of the sector's or quadrant's view. The user could then control the positioning of the visual stream left and right by long holding said visual stream and swiping or scrolling left or right as needed. To return to the native tiled view, the user would merely need to touch/click any part of the tiled visual area to cause the visual stream sizing controls to appear, and then touch or click it to return the associated visual stream back to normal.

Alternatively, the GUI 212 can allow resizing for compressed-state visual streams. In this example, any video of this type could be resized by using two fingers or a corresponding mouse control to expand or compress the visual stream size within the constraints of the sector view. Portrait videos within a landscape view could not be expanded more than said video's width or compressed below said video's height. Similarly, landscape videos within a portrait view could not be expanded to more than said video's height or compressed below said video's width. During expansion or compression, a colored outline of the video border, unconstrained by the limits of the sector view, will temporarily appear in proportion to the size of the video to better convey to the viewer the zoom the video is currently in as compared to its base state. Similar to the initial case described, the user would control the positioning of the visual stream in the direction of their choosing by long holding said visual stream and swiping or scrolling in their preferred direction as needed. This method provides more flexibility to the user, but also makes switching between optimized pre-set views slightly more complicated, as user input can customize the size of visual streams at will.

In practice, there are a number of ways that items of digital media content can be provided for simultaneous display at a computing device. In one example, the media player application 210 does not allow streaming of media content from a remote source, instead downloading synched media objects, either separately or within a single digital media file, directly to the storage medium 201 of the computing device 200. This would allow for virtually instantaneous user-playback with minimal server storage requirements, but would require substantial disk space on a user's personal device. In this example, the tools for automatically managing the download and deletion of files discussed with regard to the download manager 124 of the system 100 of FIG. 1 are particularly useful.

In one example, locally downloaded files can be streamed from the storage medium 201 to the display 202 by the media player application 210. Rather than play files at their native bitrate, which could cause desynchronization, streaming said files to and from the local device would allow for continuous playback without clipping or oversized dimension restrictions. If the playback bitrate or visual area dimensions of a given set of items of digital media content exceeds the buffer/read capacity of a given device, for example, due to processing or memory limitations, a given operating system, or other supporting software, then upon detection of the most restrictive parameter or parameters, the items of digital media content can be compressed into one or more synchronous streams that accommodates the restrictions. Optimally, these limitations would be immediately detectable, but they could also be calculated either through automatic means or via validation from a user.

Alternatively, where restrictions of the computing device 210 or operating environment preclude displaying all of the streams at their full bitrate, one of the streams can be selected according to respective properties of the first and second items of digital media content as a priority stream, such that device or operating environment resources are used preferentially in providing the selected stream to the display. For example, the prioritized stream could be selected according to a user-selected priority for the stream, a size of each of the first and second items of digital media content, a bitrate of each of the first and second items of digital media content, a duration of each of the first and second items of digital media content, and a position across a combined duration of the first and second items of digital media content for which each of the first and second items of digital media content contain content for display.

In the remaining examples, items of digital media content are streamed from an associated source device (not shown) via a network interface 206 of the computing device. The source device can be a server or a node in a distributed network. In one example, the items of digital media content at a source device (not shown) could be formatted to all have similar sizes and/or bitrates. This would take little effort to implement and minimal space on a server, but a picture-in-picture stream would require a high amount of bandwidth. In a further example, synched items of digital media content of different sizes and/or bitrates can be stored at the server for selection during streaming. This would require additional server storage space to accommodate media of different qualities, but allows secondary items of digital media content to stream at a proportionally smaller size from that of a main item of digital media content, theoretically reducing bandwidth constraints while the user experiences no discernable quality loss. If streams of varying quality and/or bitrates are already provided to accommodate differences in computing devices across subscribers, this only requires an equal amount or marginal increase of server disk space to implement, as smaller bitrate feeds could be used as both a primary visual stream for streams of less than optimal quality or a secondary picture-in-picture visual stream where the quality of the primary visual stream is higher.

Finally, the synchronized items of digital media content can be packaged in a single digital media file, with all items of digital media content synchronized within. It will be appreciated that, in this implementation, the media player application 210 is configured to access and read packaged media content from a particular format of digital media file. Streaming from a single package would allow for media playback with little to no risk of desynching, but adjusting individual stream qualities would be impossible unless the digital media file is made large enough to accommodate them, thereby greatly constricting bandwidth.

Regardless of the method through which the items of digital media content are provided, the media player application 210 can include a synchronization component 214 that ensures synchronization of the media content. The synchronization component 214 periodically checks the status of the playback positions for all media streams. In the case of a desynchronization, defined as a difference in playback position greater than a threshold value (for example, two hundred fifty milliseconds), the media streams can be adjusted. For local media, either streamed from local storage 201 or played more traditionally, one or more secondary media streams can have their playback position adjusted according to the primary stream either by skipping to the primary stream's playback position or by momentarily changing the rate of playback. For streaming media, in case of buffering issues, the media playback will cease, and a message is displayed. When all media streams are buffered properly, the playback position of the secondary media stream or streams are set to a position of the primary stream.

Streaming has become so ubiquitous that it is easy to forget that playback management protocol dictates playback quality to account for changes in bandwidth and playback speed. In addition, media players and the devices they reside on are typically powerful and robust enough to play sizable media objects, but in attempting to play multiple synchronized media streams, problems can arise, especially on older and mobile devices. One of the unique problems when synching downloaded streams for simultaneous playback is allowing for limitations, inherent or otherwise, of the playback device, operating system, media player, firewall, or other inhibitor. Some common limitations on local media playback for synched media include an insufficient read rate or buffer capacity to support high bitrates. Visual streams/videos with unsupported and typically oversized dimensions also cause problems on many devices. To this end, the media player application 210 includes a playback management component 216 that can prioritize usage of device resources one or more items of digital media content according to various properties of the items of digital media content. These properties can include the object or file size, the bitrate of the item of digital media content, and the duration of the item of digital media content. Device resources can include a bandwidth of the network connection, a disk read speed, a processing capacity of the computing device, and a memory of the computing device. Further, it will be appreciated that this selection can be performed dynamically, such that the selected item of digital media content is different at different times.

It will be appreciated that not all items of digital media content may contain content for all times in the overall playback of a synchronized set of streams, and thus a position of the duration of a given item of digital media contents across the entire duration of the playback period can also be used in prioritization. The prioritization of content would shift between items of digital media content as the content is received to maintain chronological media playback and help prevent quality imbalances from item of digital media content receiving disproportionate bandwidth capacity over another, where download capacity is otherwise not limited. For example, if Stream A is 10 minutes long and starts playback at time 0:00 and Stream B is 10 minutes long and starts playback at 5:00, the total duration of the media objects' playback period would be 15 minutes. Stream A would receive full resource priority from 0:00 to 5:00, and Stream B would receive full resource priority from 10:00 to 15:00. When both streams are active from 5:00 to 10:00, Streams A & B could share resource priority proportionally according to their individual bitrates. For example, the portion of the available bandwidth allocated for each stream can be equal to the ratio of the bitrate of the stream to the combined bitrate of the two streams.

In one example, if a user decides to minimize the media player application 210 with a video actively playing, two options can become available. In one implementation, the visual stream the user currently has displaying in the primary visual stream slot will display, minimized, as an overlay over the home screen or desktop or whatever other program is opened. Another alternative, generally used on mobile devices, is that audio from the stream will continue playing without any visual streams actively playing. This may be preferable if a user only wants to listen to audio content in the background as to not be distracted by unnecessary visuals.

When no video is actively being played, the GUI 212 can display an information screen associated with a given content subscription, course, or channel. In the example of a distance learning class, the GUI 212 is designed to provide quick, pre-sorted access to all available learning management system (LMS) components featuring numerous visual cues to quickly direct users to areas of importance. Rather than forcing users go through multiple menus to access relevant topics, such as pending assignments, posted grades, or newly uploaded media, this information is brought directly to the user's home screen to improve the user experience and save time.

To this end, the home screen of the GUI 212 can include delineated sections for each channel or course for which the user is subscribed/enrolled, plus a recent activity section. Each section features a plurality of shortcuts, represented by icons or text, which direct users to different LMS components of the interface. These may include, but are not limited to, channel or course information, announcements, pending assignments, grades, message boards, forums, chat interfaces, a channel or course-wide search interface, and/or a toggleable sorting interface. Course or channel information can include a name for the course or channel, an instructor's name, and channel or course icons, which can be selected by default according to a category associated with the course or channel or custom uploaded by a department or in institution.

Icons can have a number next to them if their corresponding sections have content that is either new or needs to be addressed, with numbers next to announcements, grades, forums, and the sorting media toggle indicate new content has been added which should be viewed, and numbers next to pending assignments indicating the number of assignments that are coming due which have not yet been submitted as complete. Channels or course numbers only pertain to the number of items that must be addressed in a given LMS section, and numbers in the Recent Activity section feature the cumulative sum of all numbers in registered courses or subscribed channels. When an icon in recent activity is clicked, the interface is adjusted to delineate information from all channels or courses instead of just one.

Media can be displayed in reverse chronological order, which is useful for education & non-episodic entertainment media, and standard chronological order, which is primarily useful for episodic entertainment media. The Media Toggle can be used to switch the way clickable media thumbnails are sorted to either prioritize recently watched media, prioritize most recently uploaded or obtained media, or to show only unviewed or unaccessed media. Each thumbnail can be color coded to indicate its associated course or channel. An icon, such as a checkmark, can be displayed to show that a given item of digital media content has been downloaded to local storage 201. The interface can also include controls for accessing old or unpinned channels or courses at the bottom of the scrollable interface as well as switching between downloading or streaming an item of digital media content. Thumbnails can include a video name which accesses said media when touched or clicked, as well as a progress bar indicating how far through a video the user has progressed.

In one example, white borders of varying opacity to differentiate between media that was accessed previously, regardless of the position of the displayed media progress bar, although different colored or shaded borders could also be used. Content that has been accessed previously, regardless of if that content is currently downloaded or not, appear with a lower opacity, making the outline of these videos seem lighter or brighter than those that have not yet been accessed, which will utilize a default higher opacity that is visually darker. This ensures that a student will not miss content for a given course.

Figure 3:
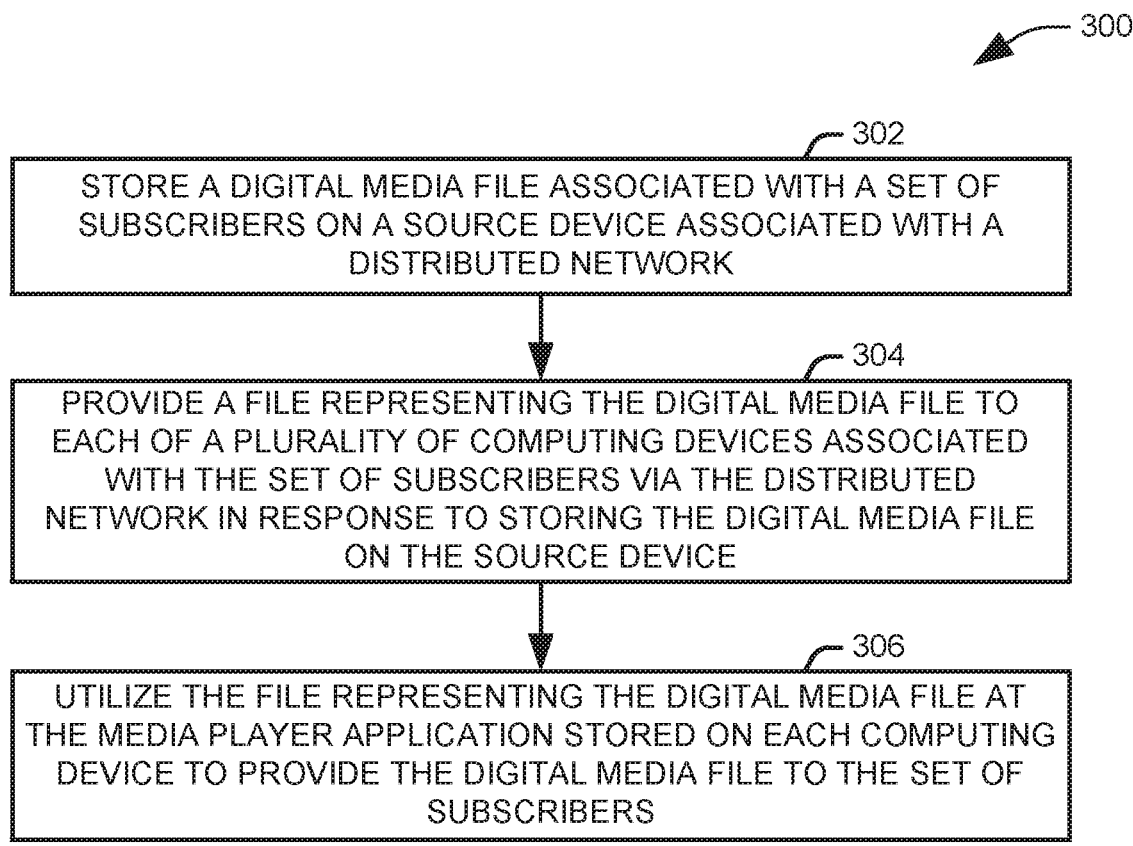
FIG. 3 illustrates one example of a method for providing digital media content to subscribers.
Figure 4:
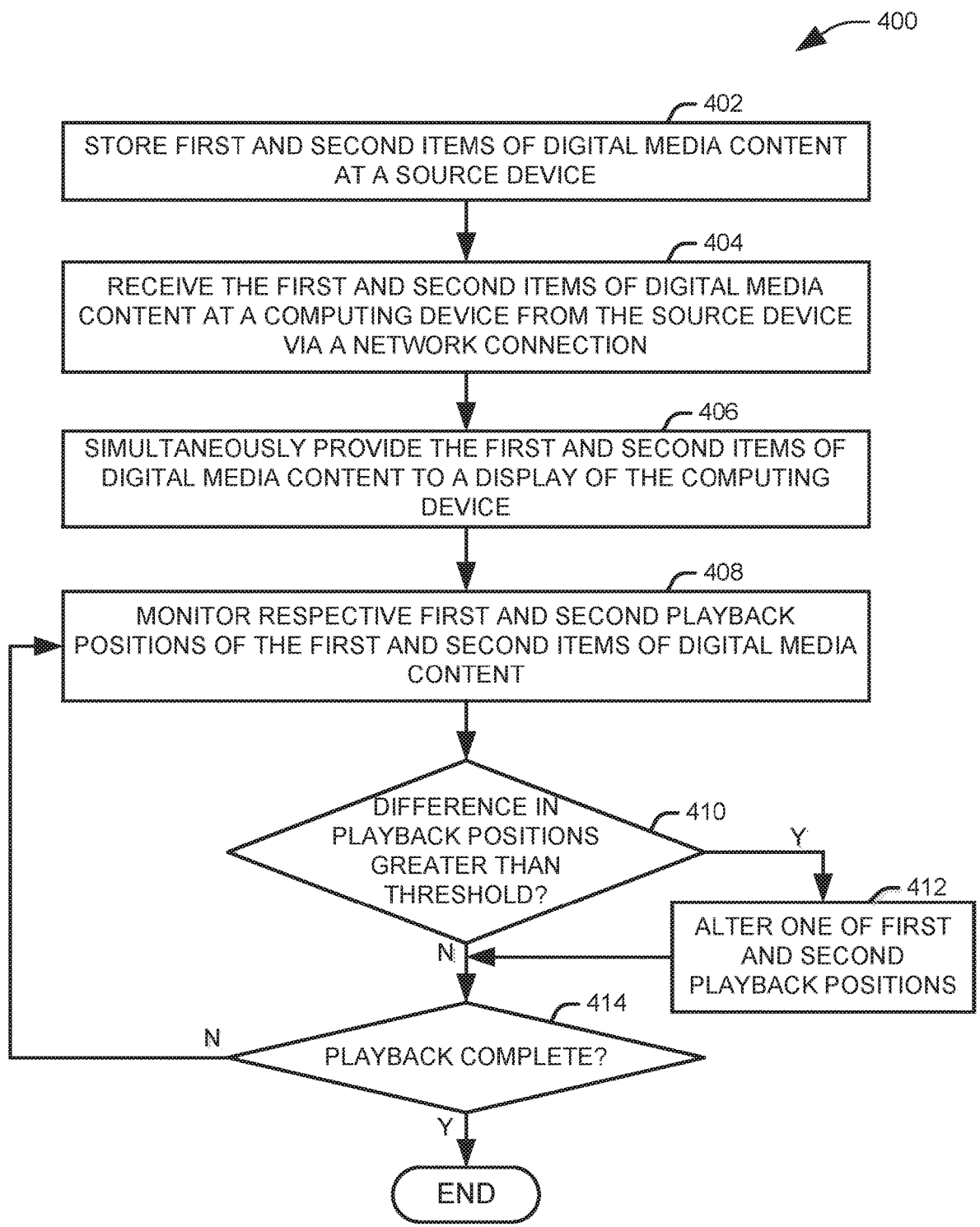
FIG. 4 illustrates one example of another method for providing digital media content to subscribers.
Figure 5:
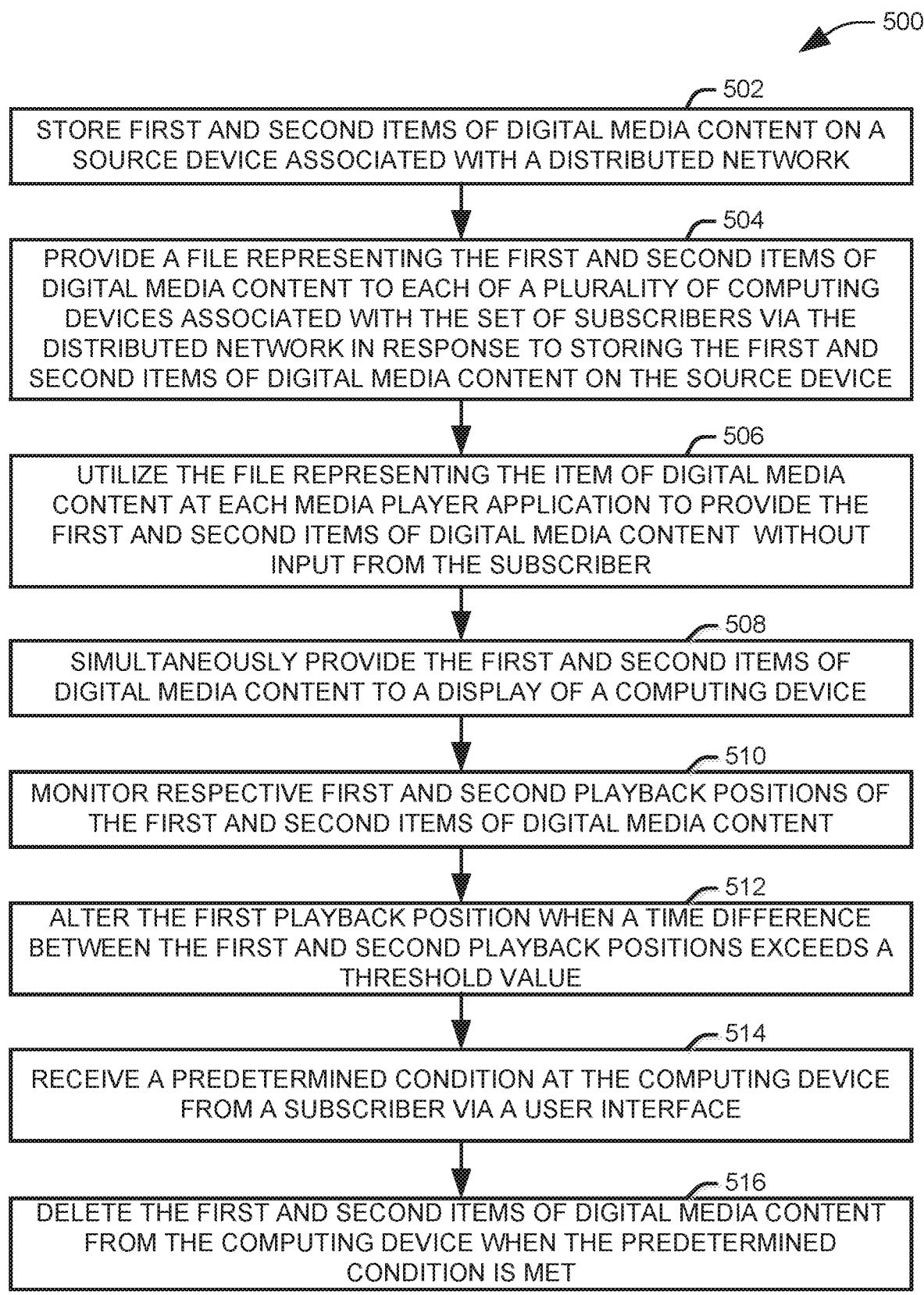
FIG. 5 illustrates one example of yet another method for providing digital media content to subscribers.

In view of the foregoing structural and functional features described above, example methods will be better appreciated with reference to FIGS. 3-5. While, for purposes of simplicity of explanation, the example methods of FIGS. 3-5 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 3 illustrates one example of a method 300 for providing digital media content to subscribers. At 302, a digital media file associated with a set of subscribers is stored on a source device associated with a distributed network. For example, the source device can be a node in an unstructured peer-to-peer network or a node in a blockchain network. At 304, a file representing the digital media file is provided to each of a plurality of computing devices associated with the set of subscribers via the distributed network in response to storing the digital media file on the source device. In one example, a torrent file representing the digital media file is established in response to storing the digital media file on the source device, and one of the torrent file and a magnet link representing the torrent file is provided to each of the plurality of computing devices via the distributed network.

At 306, the file representing the digital media file is utilized at a media player application stored on each of the computing devices to provide the digital media file to the set of subscribers. In one example, this process can be automated to proceed without input from a subscriber associated with the computing device. Continuing the example using a torrent file, the torrent file or magnet link can be utilized at the media player application to provide the item of digital media content from the source device to each of the first proper subset of the plurality of computing devices via the distributed network. The torrent file or magnet link can then be utilized at the media player to provide the digital media file from one or more of the first proper subset of computing devices to each of the second proper subset of computing devices.

In one example, the media player application can be configurable by a given subscriber to provide a predetermined condition upon which the media player application automatically deletes the digital media file. For example, the predetermined condition can be a determination that the available disk space of the associated computing device has fallen below a threshold value, and the media player application is configured to monitor available disk space on computing device and delete the digital media file when the available disk space is below the threshold value. Alternatively, the predetermined condition is a passage of a predetermined period of time since either the time at which a given subscriber of the set of subscribers accessed the digital media file, a time at which a given subscriber of the set of subscribers first accessed the digital media file, or a time at which the digital media file was stored on the computing device. In this instance, the media player application can monitor a time at which the subscriber accesses the digital media file to determine when the file should be deleted.

In another example, the digital media file can include a first item of digital media content and a second item of digital media content that are simultaneously displaying via the media player application. In this instance, the media player application can monitor a first playback position, associated with the first item of digital media content, and a second playback position, associated with the second item of digital media content, and alter the first playback position when a time difference between the first playback position and the second playback position exceeds a threshold value, such as two hundred fifty milliseconds.

FIG. 4 illustrates another example of a method 400 for providing digital media content to subscribers. At 402, first and second items of digital media content are stored at a source device. At 404, the first and second items of digital media content are received at a computing device from the source device via a network connection. In one implementation, the network interface is configured to receive the first and second items of digital media content from the source device via a distributed network. For example, the first and second items of digital media content are received indirectly from the source device via a peer-to-peer network.

At 406, the first and second items of digital media content are simultaneously provided to a display of the computing device. In one implementation, the first and second items of digital media content are provided to the display as media streams, such that the media player provides the first and second items of digital media content to the display as the first and second items of digital media content are received at the network interface. In another implementation, the first and second items of digital media content are stored in a local storage of the computing device, and the media player provides the first and second items of digital media content to the display from the local storage as respective media streams from the local storage. To facilitate maintenance of the synchronization of the two streams, both items of media content can be provided to the display even when display of one of the items of content is not desired by the user. In this instance, one of the items of digital media content can be provided to the display in a form that is not visible to a user of the computing device.

Regardless of the immediate source of the streaming content, the media player can select one of the first and second items of digital media content according to respective properties of the first and second items of digital media content and prioritize the selected one of the first and second items of digital media content in providing the first and second items of digital media content to the display, such that a resource associated with the computing device is used preferentially for the selected one of the first and second items of digital media content. It will be appreciated that this selection can be performed dynamically, such that the selected one of the first and second items of digital media content is the first item of digital media content at a first time in the display of the first and second items of digital media content and the second item of digital media content at a second time in the display of the first and second items of digital media content.

The properties used to prioritize one of the first and second items of digital media content can include one or more of a size of each of the first and second items of digital media content, a bitrate of each of the first and second items of digital media content, a duration of each of the first and second items of digital media content, and a position across a combined duration of the first and second items of digital media content for which each of the first and second items of digital media content contain content for display. The resource allocated in response to this selection can include one of a bandwidth of the network connection, disk read speed, a processing capacity of the computing device, and a memory of the computing device. It will be appreciated that, when streaming from local storage, allocation of the bandwidth of the network connection is not necessary.

At 408, respective first and second playback positions of the first and second items of digital media content are monitored. At 410, it is determined if a time difference between the first playback position and the second playback position exceeds a threshold value. If so (Y), either the first or second playback position is altered at 412 and the method continues to 414. Otherwise (N), the method advances directly to 414. At 414, it is determined if playback of the first and second items of media content is complete. If not (N), the method returns to 408 to monitor the first and second playback positions. Once the playback is complete (Y), the method terminates.

FIG. 5 illustrates yet another example of a method 500 for providing digital media content to subscribers. At 502, first and second items of digital media content are stored on a source device associated with a distributed network. The first and second items of digital media content are associated with a set of subscribers. At 504, a file representing the first and second items of digital media content is provided to each of a plurality of computing devices associated with the set of subscribers via the distributed network in response to storing the first and second items of digital media content on the source device. Each of the plurality of computing devices stores a media player application.

At 506, the file representing the item of digital media content is utilized at each media player application to provide the first and second items of digital media content to the set of subscribers without input from the subscriber. At 508, the first and second items of digital media content are simultaneously provided to a display of a given one of the set of computing devices via the media player application. At 510, each of a first playback position, associated with the first item of digital media content, and a second playback position, associated with the second item of digital media content are monitored at the media player application. At 512, the first playback position is altered when a time difference between the first playback position and the second playback position exceeds a threshold value. At 514, a predetermined condition is received at a given computing device from a subscriber via a user interface. At 516, the first and second items of digital media content are deleted from the computing device when the predetermined condition is met.

Figure 6:
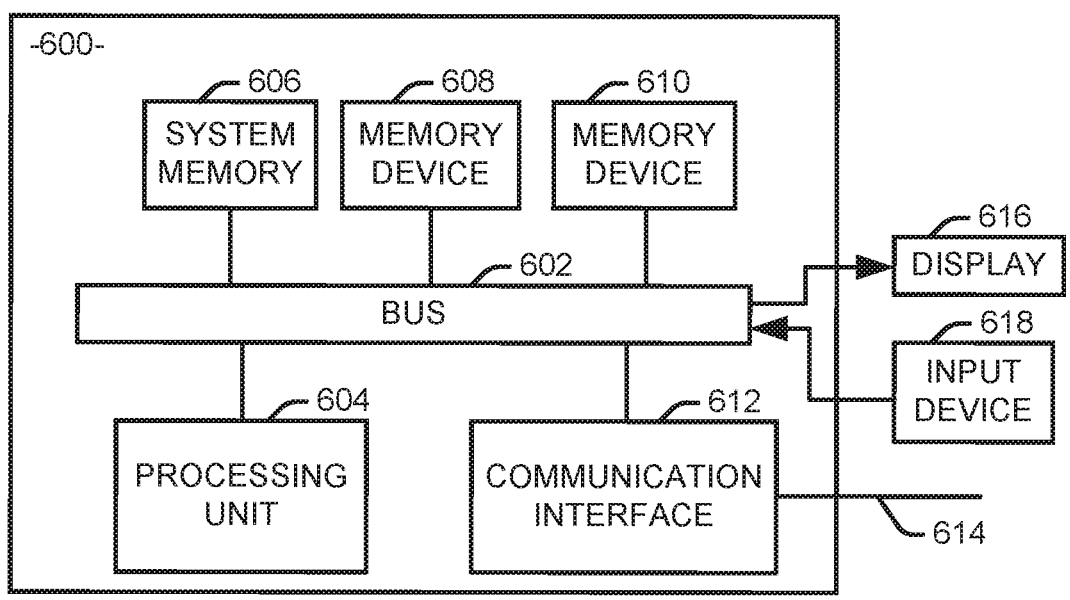
FIG. 6 is a schematic block diagram illustrating an exemplary system of hardware components capable of implementing examples of the systems and methods disclosed in FIGS. 1-5.

FIG. 6 is a schematic block diagram illustrating an exemplary system 600 of hardware components capable of implementing examples of the systems and methods disclosed herein. The system 600 can include various systems and subsystems. The system 600 can be a personal computer, a laptop computer, a workstation, a computer system, an appliance, an application-specific integrated circuit (ASIC), a server, a server BladeCenter, a server farm, etc.

The system 600 can include a system bus 602, a processing unit 604, a system memory 606, memory devices 608 and 610, a communication interface 612 (e.g., a network interface), a communication link 614, a display 616 (e.g., a video screen), and an input device 618 (e.g., a keyboard, touch screen, and/or a mouse). The system bus 602 can be in communication with the processing unit 604 and the system memory 606. The additional memory devices 608 and 610, such as a hard disk drive, server, standalone database, or other non-volatile memory, can also be in communication with the system bus 602. The system bus 602 interconnects the processing unit 604, the memory devices 606-610, the communication interface 612, the display 616, and the input device 618. In some examples, the system bus 602 also interconnects an additional port (not shown), such as a universal serial bus (USB) port.

The processing unit 604 can be a computing device and can include an application-specific integrated circuit (ASIC). The processing unit 604 executes a set of instructions to implement the operations of examples disclosed herein. The processing unit can include a processing core.

The additional memory devices 606, 608, and 610 can store data, programs, instructions, database queries in text or compiled form, and any other information that may be needed to operate a computer. The memories 606, 608 and 610 can be implemented as computer-readable media (integrated or removable), such as a memory card, disk drive, compact disk (CD), or server accessible over a network. In certain examples, the memories 606, 608 and 610 can comprise text, images, video, and/or audio, portions of which can be available in formats comprehensible to human beings.

Additionally or alternatively, the system 600 can access an external data source or query source through the communication interface 612, which can communicate with the system bus 602 and the communication link 614.

In operation, the system 600 can be used to implement one or more parts of a system for distributed digital media content to subscribers in accordance with the present invention. Computer executable logic for implementing the system resides on one or more of the system memory 606, and the memory devices 608 and 610 in accordance with certain examples. The processing unit 604 executes one or more computer executable instructions originating from the system memory 606 and the memory devices 608 and 610. The term "computer readable medium" as used herein refers to a medium that participates in providing instructions to the processing unit 604 for execution. This medium may be distributed across multiple discrete assemblies all operatively connected to a common processor or set of related processors. Specific details are given in the above description to provide a thorough understanding of the embodiments. However, it is understood that the embodiments can be practiced without these specific details. For example, physical components can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps, and means described above can be done in various ways. For example, these techniques, blocks, steps, and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine-readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing that contain or carry instruction(s) and/or data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on.

What is claimed is:

1. A method comprising:
   storing a digital media file on a source device associated with a distributed network, the digital media file being associated with a set of subscribers;
   providing a file representing the digital media file to each of a plurality of computing devices associated with the set of subscribers via the distributed network in response to storing the digital media file on the source device, each of the plurality of computing devices storing a media player application; and
   utilizing the file representing the digital media file at the media player application stored on each of the plurality of computing devices to provide the digital media file to each of the plurality of computing devices;
   wherein the file representing the digital media file is utilized at the media player application stored on a given computing device of the plurality of computing devices without input from an associated subscriber of the plurality of subscribers.

2. The method of claim 1, wherein providing the file representing the digital media file to each of the plurality of computing devices comprises:
   establishing a torrent file representing the digital media file in response to storing the digital media file on the source device;
   providing one of the torrent file and a magnet link representing the torrent file to each of the plurality of computing devices via the distributed network;
   utilizing the one of the torrent file and a magnet link representing the torrent file at the media player application stored on each of a first proper subset of the plurality of computing devices to provide the item of digital media content from the source device to each of the first proper subset of the plurality of computing devices via the distributed network; and
   utilizing the one of the torrent file and the magnet link at the media player application stored on each of a second proper subset of computing devices to provide the digital media file from one or more of the first proper subset of computing devices to each of the second proper subset of computing devices.

3. The method of claim 1, wherein the media player application is configurable by a given subscriber to provide a predetermined condition, the media player application automatically deleting the digital media file when the condition is met.

4. The method of claim 3, wherein the media player application is configured to monitor available disk space on an associated one of the plurality of computing devices and the predetermined condition is a determination that the available disk space of the associated computing device has fallen below a threshold value.

5. The method of claim 3, further comprising monitoring, at the media player application stored on each of the plurality of computing devices, a time at which each of the set of subscribers access the digital media file, wherein the predetermined condition is a passage of a predetermined period of time since one of the time at which a given subscriber of the set of subscribers accessed the digital media file, a time at which a given subscriber of the set of subscribers first accessed the digital media file, and a time at which the digital media file was stored on the computing device.

6. The method of claim 1, wherein the digital media file includes a first item of digital media content and a second item of digital media content, and utilizing the file representing the item of digital media content at the media player application at a given computing device comprises simultaneously displaying each of the first item of digital media content and the second item of digital media content via the media player application.

7. The method of claim 6, further comprising:
   monitoring a first playback position, associated with the first item of digital media content, at the media player application;
   monitoring a second playback position, associated with the second item of digital media content, at the media player application; and
   altering the first playback position when a time difference between the first playback position and the second playback position exceeds a threshold value.

8. A system for providing media content, comprising:
   a source device storing first and second digital media files; and
   a computing device comprising:
   a network interface configured to receive the first and second digital media files from the source device via a network connection; and
   a media player configured to simultaneously provide the first and second digital media files to a display of the computing device, the media player comprising a synchronization component that monitors a first playback position, associated with the first digital media file, and a second playback position, associated with the second digital media file, and alters the first playback position when a time difference between the first playback position and the second playback position exceeds a threshold value.

9. The system of claim 8, wherein the media player is configured to provide the first digital media file to the display in a form that is not visible to a user of the computing device.

10. The system of claim 8, wherein the first and second digital media files are stored in a local storage of the computing device, and the media player provides the first and second digital media files to the display from the local storage as respective media streams from the local storage.

11. The system of claim 10, the media player comprising a playback management component configured to select one of the first and second digital media files according to respective properties of the first and second digital media files and prioritize the selected one of the first and second digital media files in providing the first and second digital media files to the display, such that a resource associated with the computing device is used preferentially for the selected one of the first and second digital media files.

12. The system of claim 8, wherein the network interface is configured to receive the first and second digital media files from the source device via a distributed network, wherein a distributed network is a network in which files are stored across multiple nodes of a network in a manner accessible without a central server or a directory of files.

13. The system of claim 12, wherein the first and second digital media files are received indirectly from the source device via a peer-to-peer network.

14. The system of claim 8, wherein the first and second digital media files are provided to the display as media streams, such that the media player provides the first and second digital media files to the display as the first and second digital media files are received at the network interface.

15. The system of claim 14, the media player comprising a playback management component configured to select one of the first and second digital media files according to respective properties of the first and second digital media files and prioritize the selected one of the first and second digital media files in receiving the first and second digital media files, such that a resource associated with one of the network connection and the computing device is used preferentially for the selected one of the first and second digital media files.

16. The system of claim 15, wherein the properties of the first and second digital media files comprise one or more of a size of each of the first and second digital media files, a bitrate of each of the first and second digital media files, a duration of each of the first and second digital media files, and a position across a combined duration of the first and second digital media files for which each of the first and second digital media files contain content for display.

17. The system of claim 15, wherein the resource associated with one of the network connection and the computing device comprises one of a bandwidth of the network connection, disk read speed, a processing capacity of the computing device, and a memory of the computing device.

18. The system of claim 14, wherein the playback management component is configured to select the one of the first and second digital media files dynamically, such that the selected one of the first and second digital media files is the first digital media file at a first time in the display of the first and second digital media files and the second digital media file at a second time in the display of the first and second digital media files.

19. A method comprising:

storing first and second digital media files on a source device associated with a distributed network, the first and second digital media files being associated with a set of subscribers;

providing at least one file representing the first and second digital media files to each of a plurality of computing devices associated with the set of subscribers via the distributed network in response to storing the first and second digital media files on the source device, each of the plurality of computing devices storing a media player application;

utilizing the at least one file representing the first and second digital media files at the media player application stored on each of a set of computing devices associated with the set of subscribers to provide the first and second digital media files to the set of subscribers, wherein utilizing the at least one file representing the first and second digital media files at the media player application is performed at each of the set of computing devices without input from an associated subscriber of the set of subscribers;

simultaneously providing the first and second digital media files to a display of a given computing device of the set of computing devices via the media player application associated with the given computing device;

monitoring each of a first playback position, associated with the first digital media file, and a second playback position, associated with the second digital media file at the media player application associated with the given computing device;

altering the first playback position when a time difference between the first playback position and the second playback position exceeds a threshold value;

receiving a predetermined condition at the given computing device from an associated subscriber via a user interface; and deleting the first and second digital media files from the given computing device when the predetermined condition is met.

* * * * *